Oct. 23, 1962   H. HELL ET AL   3,059,556
OPERATING MECHANISM FOR CAMERAS AND THE LIKE
Filed Dec. 2, 1959   3 Sheets-Sheet 1

INVENTORS
Hans Hell and
Hans Hermann Koeppel
BY
Michael S. Striker
Attorney

Oct. 23, 1962    H. HELL ET AL    3,059,556
OPERATING MECHANISM FOR CAMERAS AND THE LIKE
Filed Dec. 2, 1959    3 Sheets-Sheet 2

INVENTORS
Hans Hell and
Hans Hermann Koeppe
BY
Michael S. Striker
Attorney

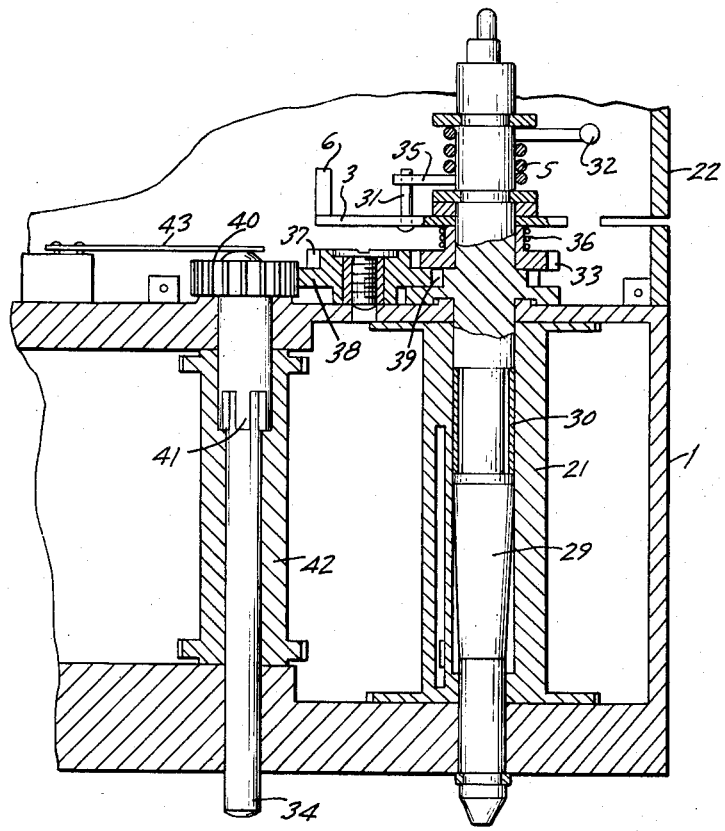

United States Patent Office 3,059,556
Patented Oct. 23, 1962

3,059,556
OPERATING MECHANISM FOR CAMERAS
AND THE LIKE
Hans Hell, Wiesbaden-Freudenberg, and Hans Hermann
Koeppe, Wiesbaden, Germany, assignors to Adox
Kamerawerk G.m.b.H., Wiesbaden-Biebrich, Germany
Filed Dec. 2, 1959, Ser. No. 856,816
Claims priority, application Germany Dec. 6, 1958
11 Claims. (Cl. 95—31)

The present invention relates to cameras.

More particularly, the present invention relates to camera operating structure.

At the present time still cameras of certain types are provided with a single operating lever which is actuated by the operator for the purpose not only of cocking the shutter but also for advancing the film so that in a single operation the next unexposed film frame is placed into the proper position to be exposed and simultaneously the shutter is cocked. In addition, suitable mechanism may be actuated for preventing double exposures.

The conventional structure for accomplishing these results suffers from the defect of being exceedingly complex and expensive and the parts quite often do not operate properly.

One of the objects of the present invention is to overcome the above drawback by providing a camera of the above type wherein the parts are of an exceedingly simple inexpensive construction which is very reliable in operation and which can very easily be manufactured and assembled as well as disassembled if desired.

It is a further object of the present invention to provide in a device of the above type an assembly wherein the operations are controlled almost entirely by a means which consists of a single unitary element of exceedingly simple construction.

With the above objects in view the present invention includes in a camera a support means and a manually operable means movable by the operator between a rest position and an operating position. A shutter cocking means is supported by the support means for movement between an uncocking position where the camera shutter is uncocked and a cocking position where the camera shutter is cocked, and a motion transmitting means cooperates with the manually operable means to be actuated thereby and with the shutter cocking means to move the latter from the uncocking to the cocking position thereof when the manually operable means is moved by the operator from its rest to its operating position. In accordance with the present invention, this motion transmitting means consists of a single element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 6 is a fragmentary sectional elevation illustrating the manner in which the structure of the invention cooperates with the film advancing structure of the camera.

Figure 1:
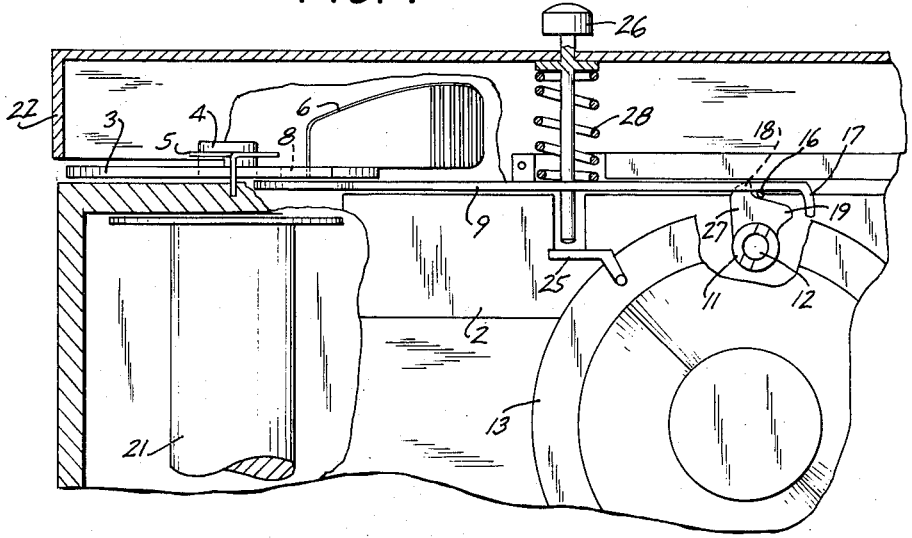
FIG. 1 is a fragmentary sectional elevation of a camera which includes the structure of the invention, the structure of FIG. 1 being shown as it appears when looking from the front of the camera toward the rear thereof.
Figure 2:
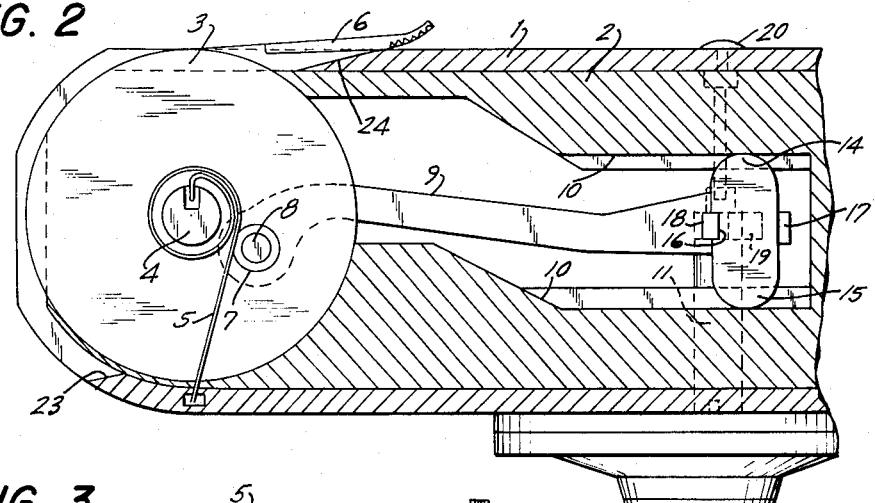
FIG. 2 is a top plan view, in section, of the structure of FIG. 1.
Figure 3:
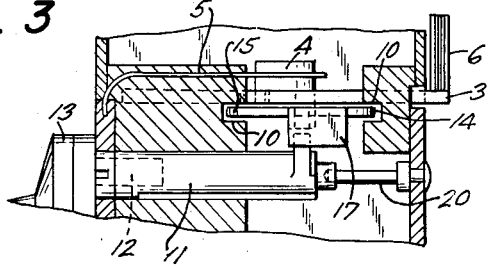
FIG. 3 is a transverse sectional view of the structure of FIG. 1.

Referring to FIGS. 1–5, the camera housing 1 forms a support means for the structure of the invention and carries a guide means 2 in the form of one or more rigid bodies fixedly carried by the camera housing 1 in the interior thereof and formed with a pair of elongated guideways 10 in the form of a pair of grooves which are directed toward each other which are parallel to each other and located at the same elevation, as is evident particularly from FIGS. 2 and 3. The camera housing 1 also carries a viewfinder housing 22 in which part of the structure of the invention is located.

As is diagrammatically shown in FIGS. 1–5, a pin 4 is supported by the support means 1 for turning movement about its axis, and a manually operable means 3 is fixed to the pin 4 for turning movement therewith. This manually operable means 3 is in the form of a plate which is fixed at its inner periphery to the pin 4, and a projection 6 is fixed to and extends from the plate 3 to the exterior of the camera so as to be accessible to the user, this extension 6 together with the plate 3 forming a manually operable lever which is turnable about the axis of the pin 4 between the rest position shown in FIGS. 1 and 2 and the operating position shown in FIGS. 4 and 5. One end of a spiral spring 5 is fixed to the pin 4 and the other end of this spring is fixed directly to the housing so that the spring 5 urges the manually operable means 3 to the rest position illustrated in FIGS. 1 and 2. A motion transmitting means 9 is operatively associated with the lever means 3, 6 to be actuated by the latter, and the connection of the elements 3 and 9 is formed by an opening 7 of the plate 3 and a projection 8 struck from the material of the element 9 and extending through the opening 7 and being spread apart at its free end so as to prevent the extension 8 from leaving the opening 7, and in this way a portion of the element 9 itself is used to provide the pivotal connection between the element 9 and the rotary manually operable means 3. The motion transmitting means 9 is guided at its portion distant from the plate 3 by the guideways 10 of the guide means 2, and during turning of the plate 3 the elongated motion transmitting means 9 will shift longitudinally sliding along the guideways 10.

Figure 4:
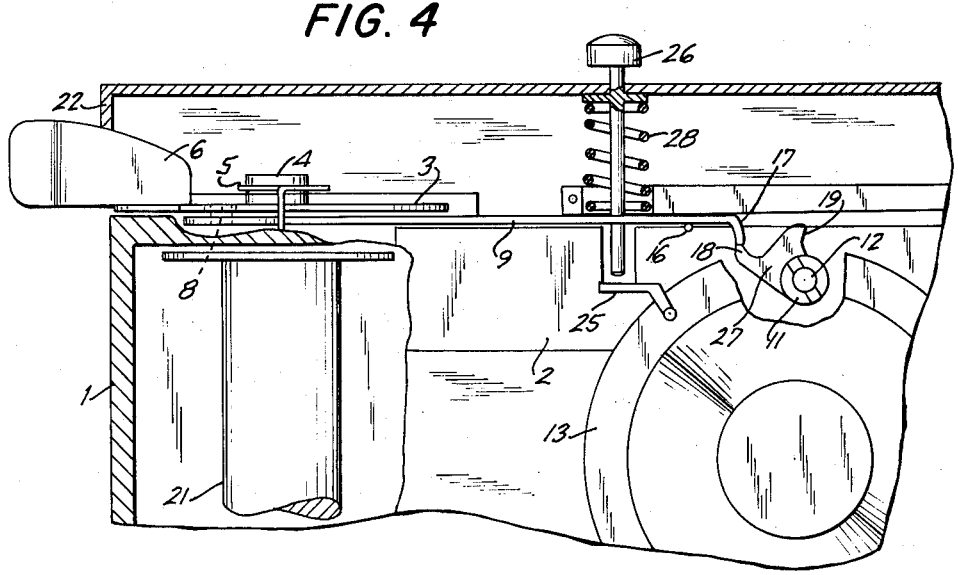
FIG. 4 shows the structure of FIG. 1 in a different position.
Figure 5:
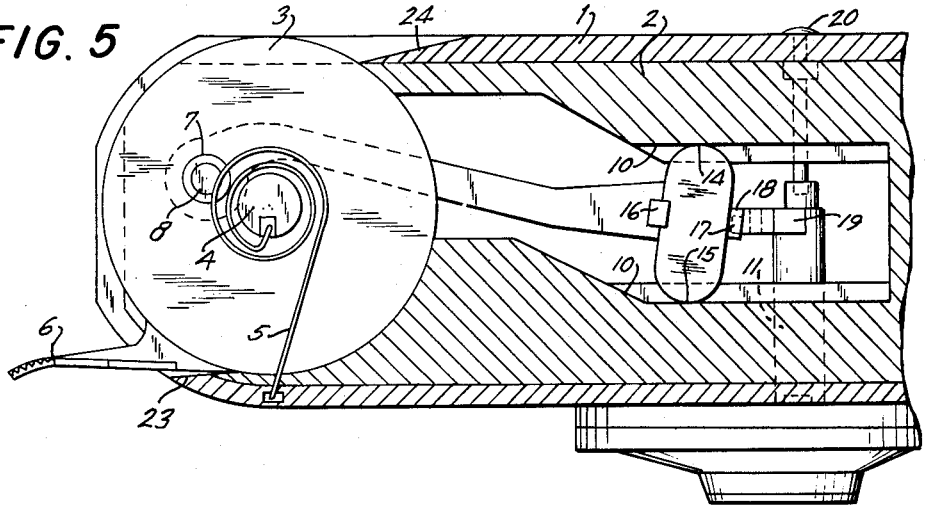
FIG. 5 is a plan view similar to FIG. 2 but showing the position which the parts take when they have the position shown in FIG. 4.

The camera includes a turnable shutter cocking means 11, 12 which is turnably supported by the support means of the camera for turning movement between the uncocking position of FIGS. 1 and 2 where the shutter is not cocked and the cocking position of FIGS. 4 and 5 where the shutter is cocked. The shutter cocking means 11, 12 includes the shaft 12 which is directly connected with the shutter structure and the shaft 11 coupled to the shaft 12 to turn the latter. The shaft 12 cooperates with the shutter 13 in a conventional manner to cock the latter. A pin 20 is carried by the housing 1 and extends part way into a bore of the shaft 11 to contribute to the support of the latter as well as to determine the axial position thereof. As is apparent particularly from FIGS. 2 and 5 the motion transmitting means 9 is provided at its end portion distant from the plate 3 with a pair of opposed lateral projections having rounded free end portions 14 and 15 located within and supported and guided by the grooves 10. The rounded free end portions 14 and 15 provide not only for longitudinal shifting of the motion transmitting means 9 but also for angular turning thereof as is apparent from a comparison of FIGS. 2 and 5. A pair of operating projections 16 and 17 are integral with and extend downwardly from the motion transmitting means 9 and form part of the latter, these projections 16 and 17 being bendable due to the bendable nature of the plate from which the element 9 is made so that it is possible to adjust the projections 16 and 17 simply by properly bending the same. The operating projection 17 is simply a downwardly bent free end of the element 9 while the projection 16 is in the form of a tongue struck downwardly from the material of the element 9. The shaft 11 of the shutter cocking means includes a projecting portion 27 terminating in a pair of teeth 18 and 19 which are respectively located in the path of movement of the projections 16 and 17 to the left beyond the position shown in FIG. 1, so that through cooperation with these teeth 18 and 19 the projections 16 and 17 of the motion transmitting means 9 enable the shutter cocking means to be moved from the uncocking position of FIG. 1 to the cocking position of FIG. 4.

As is apparent from FIG. 3, the grooves 10 are provided with upper and lower surfaces respectively cooperating with the upper and lower surfaces of the rounded free ends 14 and 15 of the lateral projection of the motion transmitting means 9, so that in this way this motion transmitting means is guided for longitudinal and angular movement in its own plane but cannot move up or down from the elevation illustrated in FIGS. 1 and 4.

The shutter 13 includes a conventional shutter release lever 25 which is turned in a counter-clockwise direction, as viewed in FIGS. 1 and 4, to release the shutter. A shutter release plunger 26 is available to the operator and a spring 28 is provided to urge the shutter release button 26 up to the position shown in FIGS. 1 and 4. When the operator presses downwardly on the button 26 the lower free end of the stem which is fixed to the button 26 will engage the lever 25 to turn the latter so as to release the shutter.

As is apparent from FIG. 2 a stop surface 24 engages the lever 6 so as to determine the rest position of the manually operable means 3 under the influence of the spring 5, and when the manually operable means 3 has been turned from the rest position of FIG. 2 to the operating position of FIG. 5 the lever 6 will engage the stop surface 23 which determines the operating position of the lever 3. During turning of this manually operable lever 3 from the rest position of FIG. 2 to the operating position of FIG. 5, the transmission means 9 moves to the left, as viewed in FIGS. 1 and 4, and the operating projection 16 cooperates with the tooth 18 so as to start to turn the shaft 11 and thus move the shutter cocking means toward its cocking position. The turning of the tooth 18 by the projection 16 is followed by the turning of the tooth 19 by the projection 17 and at the end of the turning of the lever 3 by the operator the tooth 17 will have passed over and beyond the tooth 19, and the tooth 18 will have with respect to the projection 17 the position indicated in FIG. 4. The shutter 13 is provided in a known way with a catch which maintains the shutter cocked until the lever 25 is actuated, this catch cooperating with the shaft 12 to permit the shutter cocking means 11, 12, 27 to be turned in a counter-clockwise direction beyond the position indicated in FIG. 4 while at the same time preventing return of the shutter cocking means to the position of FIG. 1. When the operator releases the lever 6 the spring 5 will return the manually operable means 3 and the motion transmitting means 9 to the position of FIGS. 1 and 2, and during this movement of the motion transmitting means 9 from the position of FIG. 4 to that of FIG. 1 the tooth 17 will simply press downwardly on and ride over the tooth 19 and turning the element 27 and the parts 11 and 12 slightly in a counter-clockwise direction beyond the position indicated in FIG. 4, and as soon as the tooth 17 moves to the right beyond the tooth 19 the parts 11, 12, 27 will return to the position of FIG. 4 where they will be held by the catch of the shutter mechanism until the lever 25 is turned to release the shutter. Thus, the shutter remains cocked while the motion transmitting means 9 together with the manually operable means return to their starting position, and after the shutter is released the shutter cocking means will automatically return to the uncocking position illustrated in FIG. 1.

As was pointed out above the illustration of the pin 4 in FIGS. 1–5 is diagrammatic and in the actual construction which is described below the turning of the plate 3 by the operator will result not only in cocking of the shutter but also in turning of the take-up spool 21 so as to advance the film simultaneously with the cocking of the shutter 13, and also an unillustrated double exposure prevention device is actuated by turning of the manually operable means 3.

This actual structure which is used in the actual camera instead of the turnable pin 4 is illustrated in FIG. 6. Referring to FIG. 6 it will be seen that the lever 3, 6 is in fact freely turnable on a shaft 29 which is carried by the support means formed by the camera housing 1 for rotary movement. The view finder housing 22 is formed with a slit through which the plate 3 extends so that it can freely turn and the lever 6 is of course at the exterior of the housing 22 accessible to the operator. The shaft 29 extends through the take-up spool 21 and carries a spring 30 in the interior of the take-up spool 6 fixed to the shaft 29 and frictionally pressing against the inner surface of the take-up spool 21 so that in this way the spring 30 acts as a friction clutch transmitting turning of the shaft 29 to the take-up spool 21 while at the same time permitting the shaft 29 to flip if necessary. The spring 5 is coiled about the shaft 29 and has one end fixed at 32 by a suitable rivet or the like to the viewfinder housing 22. The other free end 35 of the spring 5 engages a pin 31 fixed to and extending upwardly from the plate 3 so that in this way in the actual construction the spring 5 urges the manually operable means 3, 6 to its rest position. The plate 3 is freely turnable on top of a gear 33 through which the shaft 29 passes with the gear 33 freely turnable with respect to the shaft 29, and the elongated hub of the gear 33 is surrounded by a friction spring 36 on one end of which is fixed to the plate 3. This friction spring 36 forms in a well-known way a one-way drive so that when the plate 3 is turned by the operator from the rest position to the operating position the coils of the spring 36 tighten on the hub of the gear 33 to turn the latter, while when the spring 5 returns the manually operable means 3, 6 to its rest position the coils of the spring 36 do not grip the hub of the gear 33 and thus turns freely with respect to the latter so that the spring 36 provides a one-way drive from the plate 3 to the gear 33. This freely turnable gear 33 meshes with a gear 37 which is also freely turnable, and a gear 38 is coaxial with the gear 37 and meshes with a pair of gears 39 and 40. The gear 39 is fixed to the shaft 29 so that in this way the turning of the gear 33 is transmitted to the shaft 29 for advancing the film when the manually operable means 3, 6 is moved from its rest to its operating position. The gear 40 is connected through the shaft 34 and a suitable dog clutch 41 to the film transporting spool 42 which is provided with the usual sprockets which engage the film perforations. Thus, the turning of the gear 38 will turn the film advancing spool 42, the clutch 41 being engaged in the position of the parts shown in FIG. 6. The bottom end of the shaft 34 extends beyond the bottom wall of the camera housing 1 and is accessible to the operator who by pushing against the bottom end of the shaft 34 raises the latter and thus uncouples the clutch 41 so that now the film transporting roll 42 is freely turnable and thus rewinding of the film can be carried out without any difficulty. A leaf spring 43 presses on the top end of the shaft 34 to urge the latter downwardly to its position shown in FIG. 6 where it is coupled with the film transporting spool 42.

It should be noted that in accordance with the present invention the entire motion transmitting means 9 consists of a single element which makes for an exceedingly simple, economical, and reliable construction. The rounded free end portions 14 and 15 of the element 9 provide not only for longitudinal guiding in the grooves 10 but also for turning movement of the element 9.

It will be understood that each of the elements described above, or two or more together, may also find a useful application in other types of cameras differing from the types described above.

While the invention has been illustrated and described as embodied in camera operating structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, support means; a manually operable lever turnably carried by said support means for turning movement between a rest position and an operating position; shutter cocking means carried by said support means for movement between an uncocking position where the shutter is uncocked and a cocking position where the shutter is cocked; and a single motion transmitting element pivotally connected to and operatively connected with said lever to be actuated thereby and directly connected to and cooperating with said shutter cocking means for moving the latter from said uncocking to said cocking position thereof during movement of said lever from said rest to said operating position thereof.

2. In a camera, in combination, support means; a manually operable lever turnably carried by said support means for turning movement between a rest position and an operating position; shutter cocking means carried by said support means for movement between an uncocking position where the shutter is uncocked and a cocking position where the shutter is cocked; a single motion transmitting element pivotally connected to and operatively connected with said lever to be actuated thereby and directly connected to and cooperating with said shutter cocking means for moving the latter from said uncocking to said cocking position thereof during movement of said lever from said rest to said operating position thereof, said element being elongated and having a pair of opposed lateral projections which respectively terminate in rounded end portions; and guide means carried by said support means and having a pair of elongated guideways along which said rounded end portions of said lateral projections of said element slide, said element moving, during turning of said manually operable lever, longitudinally as well as angularly.

3. In a camera, in combination, support means; a manually operable lever turnably carried by said support means for turning movement between a rest position and an operating position; shutter cocking means carried by said support means for movement between an uncocking position where the shutter is uncocked and a cocking position where the shutter is cocked; guide means carried by said support means and having an elongated guideway; and a single motion transmitting element pivotally connected with said lever and directly connected to and cooperating with said shutter cocking means to move the latter from said uncocking to said cocking position thereof during movement of said lever from said rest to said operating position thereof, said element having a lateral projection with a rounded free end portion supported by and sliding along said guideway during longitudinal as well as angular movement of said element upon turning of said lever.

4. In a camera, in combination, support means; a manually operable lever turnably carried by said support means for turning movement between a rest position and an operating position; an elongated motion transmitting element pivotally connected at one end to said lever, said element having distant from said lever at least one operating projection which moves along a given path during turning of said lever; and rotary shutter cocking means turnably carried by said support means and having at least one operating tooth located in said path to be engaged by said operating projection during movement of said lever from said rest to said operating position thereof and to be turned by the moving operating projection of said element from an uncocking position where the shutter is uncocked to a cocking position where the shutter is cocked, said tooth of said shutter cocking means having a configuration which does not prevent movement of said element past said shutter cocking means during return of said lever to said rest position while said shutter cocking means remains in said shutter cocking position.

5. In a camera, in combination, support means; a manually operable lever turnably carried by said support means for turning movement between a rest position and an operating position; an elongated motion transmitting element pivotally connected at one end to said lever, said element having distant from said lever at least one operating projection which moves along a given path during turning of said lever; rotary shutter cocking means turnably carried by said support means and having at least one operating tooth located in said path to be engaged by said operating projection during movement of said lever from said rest to said operating position thereof and to be turned by the moving operating projection of said element from an uncocking position where the shutter is uncocked to a cocking position where the shutter is cocked, said tooth of said shutter cocking means having a configuration which does not prevent movement of said element past said shutter cocking means during return of said lever to said rest position while said shutter cocking means remains in said shutter cocking position; and manually operable shutter release means cooperating with the shutter of the camera to release the latter and said shutter cocking means upon release of the shutter by said manually operable shutter release means for returning automatically to its uncocking position where said tooth is again located in the path of movement of said projection of said element.

6. In a camera, in combination, support means; manually operable lever means turnably carried by said support means for turning movement by the operator between a rest position and an operating position; an elongated motion transmitting element pivotally connected at one end to said lever to be moved upon turning of said lever, said element having distant from said lever at least one bendable operating projection, whereby the projection may be adjusted by bending thereof; and rotary shutter cocking means carried by said support means for turning movement between an uncocking position where the shutter is uncocked to a cocking position where the shutter is cocked, said rotary shutter cocking means having a tooth located in the path of movement of said operating projection during turning of said lever from said rest to said operating position whereby said operating projection engages said tooth and turns said shutter cocking means from said uncocking to said cocking position thereof.

7. In a camera, in combination, support means; a plate turnably carried by said support means for turning movement between a rest position and an operating position, said plate being formed with an opening spaced from the axis of turning thereof; a manually engageable projection fixed to and extending from said plate so that the operator can turn said plate from said rest to said operating position; an elongated motion transmitting element having at one end a projection struck therefrom and extending through said opening of said plate to pivotally connect the element to said plate, said motion transmitting element having distant from said plate an operating projection; and shutter cocking means turnably carried by said support means for movement between an uncocking position where the shutter of the camera is uncocked to a cocking position where the shutter of the camera is cocked, said shutter cocking means having a tooth located in the path of movement of said projection during turning of said plate by the operator from said rest to said operating position so that said tooth is turned by said projection and thus said element turns said shutter cocking means from said uncocking position to said cocking position thereof.

8. In a camera, in combination, support means; manually operable means carried by said support means for movement by the operator between a rest position and an operating position; shutter cocking means carried by said support means for movement between an uncocking position where the shutter is uncocked and a cocking position where the shutter is cocked; a single motion transmitting element directly connected and actuated by said manually operable means during movement of the latter from said rest to said operating position thereof and directly connected to and cooperating with said shutter cocking means for moving the latter from said uncocking to said cocking position during movement of said manually operable means from said rest to said operating position thereof; and means actuated by said manually operable means for advancing the film by one film frame during movement of said manually operable means from said rest to said operating position thereof.

9. In a camera, in combination, support means; a manually operated member turnably mounted on said support means for movement by an operator between a rest position and an operating position; shutter cocking means carried by said support means for movement between an inoperative position had a cocking position where the shutter is cocked; and a single rigid motion transmitting element having a part pivotally connected to said manually operated member and another part mounted on said support means for turning and longitudinal movement so that said element performs during turning of said manually operated member longitudinal and angular movements, said element having another part directly engaging said shutter cocking means during the longitudinal movement of said element for moving said shutter cocking means to said cocking position during movement of said manually operated member to said operating position.

10. In a camera, a combination, support means; a manually operated member turnably mounted on said support means for movement by an operator between a rest position and an operating position; shutter cocking means carried by said support means for movement between an inoperative position and a cocking position where the shutter is cocked; and a single rigid motion transmitting integral element having at one end an integral projecting pivot pin pivotally connected to said manually operated member and at the other end an integral portion mounted on said support means for turning and longitudinal movement so that said element performs during turning of said manually operated member longitudinal and angular movements, said element having another integral projecting portion directly engaging said shutter cocking means during the longitudinal movement of said element for moving said shutter cocking means to said cocking position during movement of said manually operated member to said operating position.

11. In a camera, in combination, support means; a manually operated member turnably mounted on said support means for movement by an operator between a rest position and an operating position; shutter cocking means carried by said support means for movement between an inoperative position and a cocking position where the shutter is cocked; and a single rigid motion transmitting integral element having at one end an integral projecting pivot pin pivotally connected to said manually operated member and at the other end an integral portion having a pair of arcuate edges slidably mounted on said support means for turning and longitudinal movement so that said element performs during turning of said manually operated member longitudinal and angular movements, said element having another integral projecting portion directly engaging said shutter cocking means during the longitudinal movement of said element for moving said shutter cocking means to said cocking position during movement of said manually operated member to said operating position.

References Cited in the file of this patent

UNITED STATES PATENTS

| 2,233,006 | Goldhammer | Feb. 25, 1941 |

FOREIGN PATENTS

| 609,000 | Germany | Feb. 6, 1935 |
| 624,351 | Germany | Jan. 18, 1936 |